United States Patent [19]

Popp-Ginsbach

[11] Patent Number: 4,940,170
[45] Date of Patent: Jul. 10, 1990

[54] SPRAY HEAD FOR USE WITH A CAN CONTAINING A LIQUID EXPOSED TO THE PRESSURE OF A PROPELLANT

[75] Inventor: Hildegard Popp-Ginsbach, Munich, Fed. Rep. of Germany

[73] Assignee: F.P.D. Future Patent Development Co., S.A., Luxembourg

[21] Appl. No.: 266,815

[22] Filed: Nov. 3, 1988

[30] Foreign Application Priority Data

Nov. 10, 1987 [DE] Fed. Rep. of Germany ....... 3738163
Dec. 17, 1987 [DE] Fed. Rep. of Germany ....... 3742901

[51] Int. Cl.⁵ .............................................. B05B 3/16
[52] U.S. Cl. .................. 222/402.1; 222/500; 239/533.1; 239/570; 138/45
[58] Field of Search ............... 222/55, 61, 396, 402.1, 222/402.11, 402.19, 464, 564, 500; 239/533.1, 570; 137/504, 509, 510; 138/45-46

[56] References Cited

U.S. PATENT DOCUMENTS

| | | | |
|---|---|---|---|
| 3,542,254 | 11/1970 | Samuelson et al. | 222/402.19 |
| 3,726,009 | 4/1973 | Hackmyer | 222/402.11 X |
| 3,990,640 | 11/1976 | Laauwe | 239/533 |
| 4,487,334 | 12/1984 | Werding | 222/55 |
| 4,650,094 | 3/1987 | Werding | 222/55 |
| 4,723,725 | 2/1988 | Comment | 239/533.1 |

Primary Examiner—Michael S. Huppert
Attorney, Agent, or Firm—Andrus, Sceales, Starke & Sawall

[57] ABSTRACT

A spray head (26) for use with a can (10) containing a liquid (11) exposed to the pressure of a propellant (12). The spray head being disposed on the free end of a dispensing tube (21) of a dispensing valve, especially an aerosol valve (15), and including a spray nozzle (27) in fluid communication (28) with the discharge duct (23) of the dispensing tube (21). The fluid communication (28) includes therein a throttle member (29) with a resiliently biased throttle body (30) which has one side exposed to ambient pressure while the overpressure prevailing in the can interior acts on the other side thereof and through which the flow cross-section (31) can be controlled in dependence on the overpressure in the can such that an approximately constant discharge rate per unit of time through the spray nozzle (27) is achieved until the can (10) is substantially emptied. The resilient bias of the throttle body (30) is inherent in the throttle member and is effective only during use of the device such that at maximum over-pressure in the can a minimum flow cross-section (31) is kept open.

13 Claims, 4 Drawing Sheets

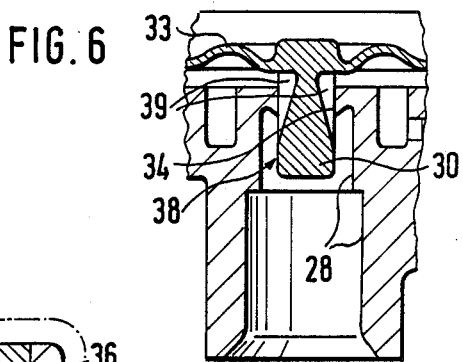
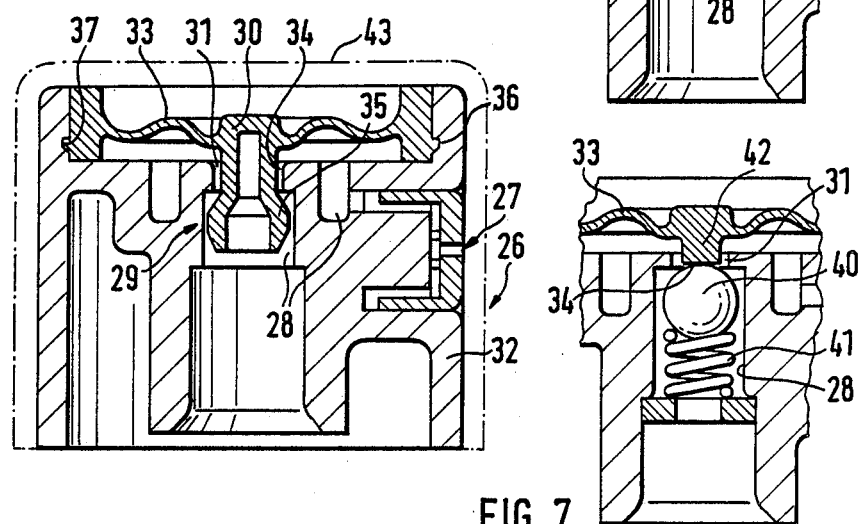
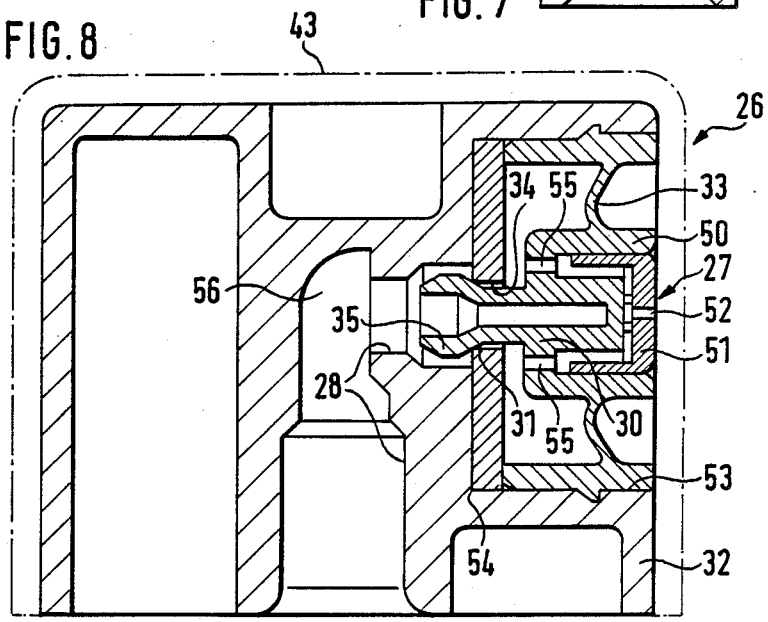

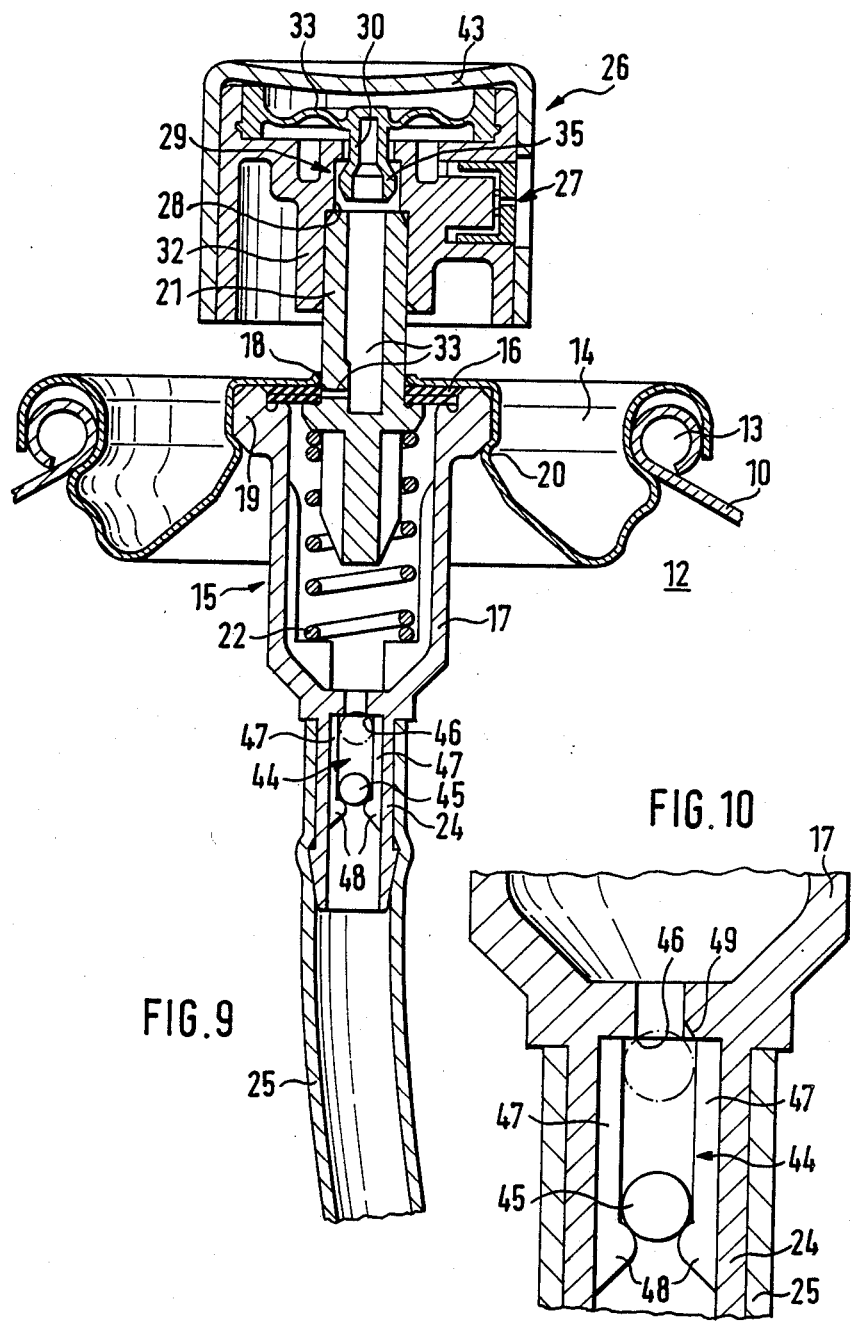

SPRAY HEAD FOR USE WITH A CAN CONTAINING A LIQUID EXPOSED TO THE PRESSURE OF A PROPELLANT

BACKGROUND OF THE PRESENT INVENTION

The present invention is directed to a spray head for use with a can or container containing a liquid exposed to the pressure of a propellant.

Spray heads of the type for so-called aerosol cans or containers are known, for instance, from WO No. 86/04163. However, the known design is extremely complex. It comprises a plunger supported in the spray head for longitudinal movement and biased by a helical compression spring so that, when the aerosol can is not in use, the fluid communication with the spray can is closed. At its one side, the plunger is exposed to ambient pressure while the other side is exposed to the overpressure in the can when the dispensing valve thereof has been opened. Then, the plunger is moved under the action of the overpressure in the can against the action of the resilient biasing force and the action of ambient pressure to a fluid-communication release position while at the same time a constriction of the flow cross-section and a corresponding restriction of the dispensed fluid is provided. The plunger which is movably supported within the spray head is sealed relative to a corresponding cylinder wall by means of two sealing rings of rubber or like material disposed at either end of the plunger. The sealing rings will contact the medium to be sprayed, said medium in most cases reacting rather aggressively so that the sealing rings swell up and the plunger movement becomes heavy until finally the plunger fails, which happens especially after a prolonged period of non-use. In the last-mentioned case there even is the risk of the plunger becoming unable to be moved to an open position due to an excessive "breakaway force", and consequently the spray nozzle remains closed and the aerosol can must be discarded although still partly filed. The waste rate on the consumer's side caused thereby is unacceptable.

It is known from US-PS No. 4,487,334 to provide a variable throttle means upstream of the dispensing valve in the can interior, said throttle means controlling the flow cross-section of the fluid passage leading to the dispensing valve in dependence on the propellant pressure. This design is likewise extremely complex and also rather unreliable in respect of continued proper operation due to unavoidable leakages in the area of the throttle.

SUMMARY OF THE PRESENT INVENTION

Proceeding from the mentioned prior art it is the object of the present invention to provide a spray head of the above-specified kind, which is provided with a permanently reliable spray regulator and is moreover distinguished by extremely simple design.

The specified object is solved by a spray head for use with a can containing a liquid exposed to the pressure of a propellant. The spray head is disposed on the free end of a dispensing tube of a dispensing valve, especially an aerosol valve, and includes a spray nozzle in fluid communication with a discharge duct of the dispensing tube. The fluid communication path includes therein a throttle member with a resiliently biased throttle body which has one side exposed to ambient pressure while the overpressure prevailing in the can interior acts on the other side thereof. The throttle body controls the flow cross-section in dependence on the overpressure in the can such that an approximately constant rate per unit of time through the spray nozzle is achieved until the can is substantially emptied. The resilient bias of the throttle body is inherent in the throttle member and is effective only during use of the device such that at maximum overpressure in the can a minimum flow cross-section is kept open. Other advantageous structural details of the invention include particular construction of the throttle member and particularly a diaphragm secured to the throttle body. The shape of the diaphragm and body may be constructed with different configurations.

Due to the fact that the resilient bias of the throttle member is inherent therein, i.e. it is predetermined by the configuration and shape of the throttle member itself, separate biasing elements such as helical compression springs or the like can be omitted. As the flow cross-section is moreover continually kept open, proper operability of the spray head even after prolonged periods of non-use is ensured. Additionally, this measure ensures that no sealing members are necessary which are movable relative to a wall and may give rise to the aforementioned difficulties.

An especially simple and effective embodiment of the inventive concept is characterized by the feature that the throttle member is joined, especially integrally, to a diaphragm disposed in the spray head housing for imparting the required resilient bias to the throttle member. This is particularly ensured when the diaphragm is configured in accordance with a wave-shaped cross-section.

A particularly simple control of the flow cross-section is achieved with a valve body having a circular-cylindrical port and a throttle body within the port. In one embodiment, a ball and opposing additional resilient biasing element is urged against the resiliency of the throttle body in accordance with the basic concept of the invention.

Propellant within the meaning of the present invention relates to compressed gas such as $N_2$ or air whose pressure automatically decreases while the aerosol can is emptied.

The embodiment set out is characterized by an especially low design effort.

The embodiments including that upon activation in extreme headfirst position no propellant escapes to the outside whereby the operability of the aerosol can would be considerably deteriorated or the can would even become useless.

BRIEF DESCRIPTION OF THE DRAWINGS

Below, preferred embodiments of the invention will be described in detail with reference to the accompanying drawing, in which:

FIGS. 5 to 7 are spray heads according to FIGS. 2 to 4 each having a modified throttle member diaphragm;

FIG. 8 is an enlarged longitudinal section through a still further modified embodiment of a spray head;

FIG. 9 is a longitudinal section through a spray head as shown in FIG. 5 but comprising an additional headfirst closing valve in the dispensing valve body;

FIG. 10 is an enlarged longitudinal section through the headfirst closing valve of the embodiment illustrated in FIG. 9.

DESCRIPTION OF THE ILLUSTRATED EMBODIMENT

Figure 1:
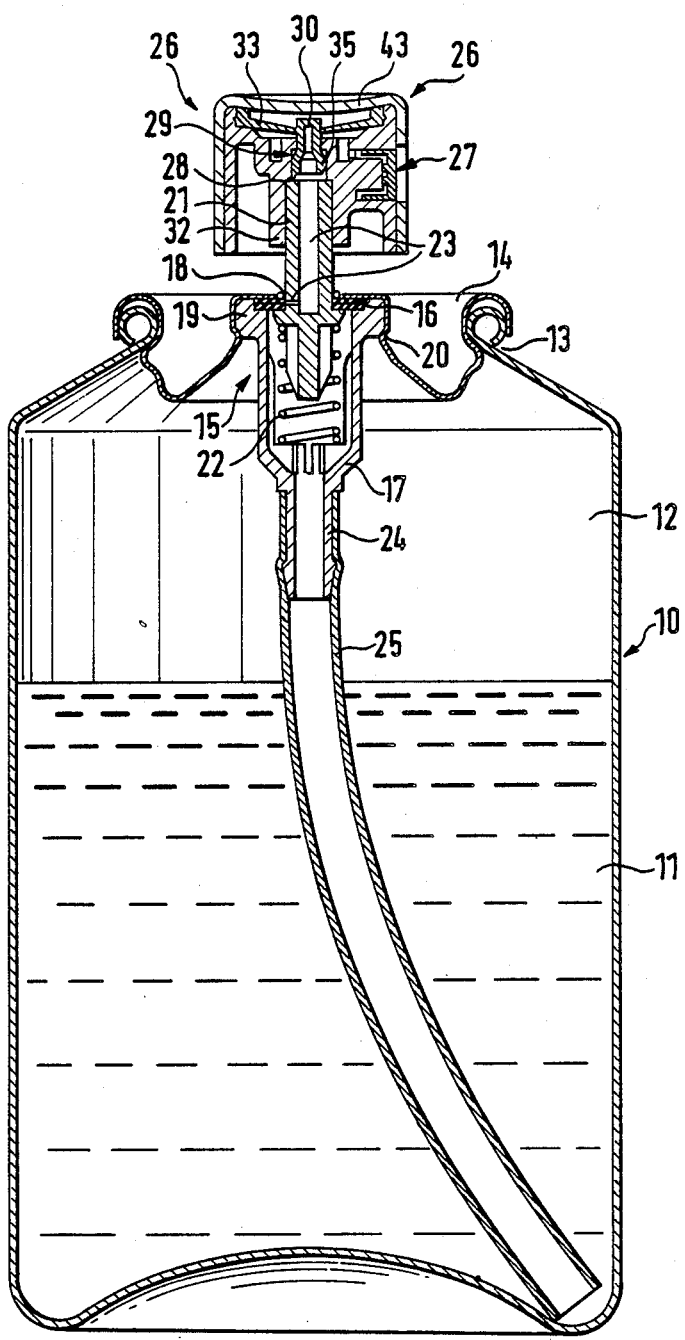
FIG. 1 is a schematic longitudinal section through a first embodiment of an aerosol can comprising the spray head in accordance with the invention.

FIG. 1 is a longitudinal section through a so-called aerosol can 10 which is filled with liquid medium 11 and propellant 12 being at an initial pressure of about 9 bars. The liquid medium 11 occupies approximately two-thirds while the propellant 12 occupies about one-third of the volume of the can. The liquid medium 11 may be a liquid, paste or like material which can be discharged by the pressure of the propellant. The propellant used may be compressed nitrogen or compressed air. The can 10 is made from thin tin plate or like material The upper can opening 13 is closed by a cover 14 which is likewise made from tin plate or like material In a manner known per se, the cover 14 includes a central opening 18 for accommodating a dispensing valve or aerosol valve 15 such that the valve 17 of the dispensing valve 15 is secured in fluid tight fashion to the edge of the cover opening 18. To this end the valve body 17 of the dispensing valve 15 includes a radially outwardly extending peripheral flange 19 behind which in the assembled state an annular projection 20 formed on the cover to extend radially inwardly engages such that the valve body 17 is clampingly retained between the cover wall defining the opening 18 and the mentioned annular projection 20. Intermediate the cover wall defining the opening 18 and the peripheral flange 19 of the valve body 17 there is provided a sealing washer 16 made from rubber or a similar elastic and corrosion-proof sealant.

The dispensing valve 15 is designed as known per se. Accordingly, within the valve body 17 there is disposed a small dispensing tube 21 so as to be axially movable and/or tiltable from a closed position (FIG. 1) against the action of a helical compression spring 22, the sealing washer 16 closely embracing the dispensing tube 21 such that in the closed position of the dispensing valve 15 the sealing washer 16 closes the discharge duct 23 formed in the dispensing tube 21 in fluid-tight fashion.

A riser tube 25 extending right to the bottom of the can 10 is fitted to a connecting piece 24 of the valve body 17 provided inside the can, through which riser tube the medium 11 is discharged under the propellant pressure when the dispensing valve 15 is opened.

The upper free end of the dispensing tube 21 carries a spray head 26 fitted thereon and including a lateral spray nozzle 27. The design of the spray head 26 will be explained in detail below, especially with reference to the FIGS. 2 to 10.

Figure 2:
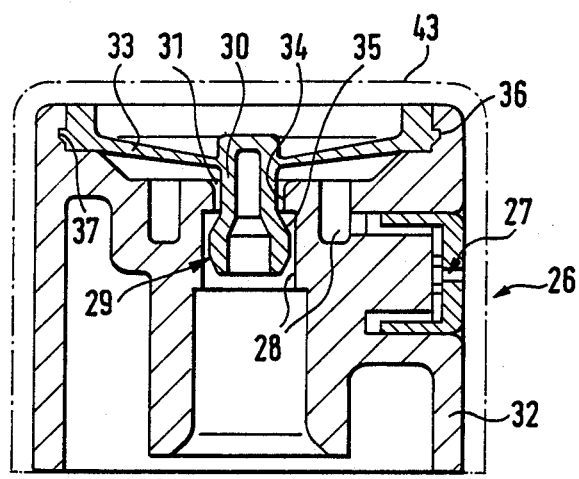
FIG. 2 is an enlarged longitudinal section through the spray head of FIG. 1.

In the case of aerosol cans using compressed gas as propellant, the initial spraying pressure of about 9 bars decreases with progressive emptying of the can down to about 3 bars, and the discharge rate is reduced accordingly. For this reason it has already been proposed to provide so-called spray regulators by means of which a predetermined discharge rate per unit of time, which is approximately uniform throughout the period of time while the can is emptied, is ensured As illustrated in FIGS. 1 and 2, to this end there is provided in the spray head 26 or, more exactly, in the fluid communication 28 between the dispensing tube 21 and the spray nozzle 27, a throttle 29 having a resiliently biased throttle body 30; ambient pressure acts on one side of said throttle body, and the other side facing the can interior is exposed to the overpressure existing in the can interior. Due to the resiliently biased throttle body 30 the flow cross-section 31 can be controlled in dependence on the can overpressure such that an approximately constant amount of liquid 11 per unit of time can be discharged through the spray nozzle 27 until the can 10 is substantially emptied.

The throttle body 30 is integral with a diaphragm 33 fixed in the spray head housing 32, the diaphragm 33 imparting to the throttle body 30 an elastic bias such that at maximum can overpressure a minimum flow cross-section (31) is kept open. As shown in FIG. 2, the throttle body 30 cooperates with a circular-cylindrical port 34 within the fluid communication 28 such that axial movement of the throttle body 30 opens the mentioned port 34 to a greater or lesser extent. As will be apparent from FIG. 2, the throttle body 30 extends through the fluid port 34, said port having associated therewith a throttle portion 35 of axially increasing or decreasing cross-section, respectively. In the embodiment shown in FIG. 2, the throttle portion 35 has frusto-conical shape so that the cross-section increases in a direction from the fluid port 34 towards the can interior, and as the interior pressure in the can is reduced the flow cross-section becomes progressively larger due to the elastic action on the throttle body 33 caused by the diaphragm 33 and the axial movement of the throttle body 30 towards the can 10 caused thereby. In this way the flow cross-section 31 is controlled such that the pressure at the spray nozzle remains approximately constant, for instance at 3.2 bars, throughout the useful life of the aerosol can. As the pressure at the spray nozzle is proportional to the discharged quantity per unit of time, a constant discharge rate per unit of time is obtained in this way. The diaphragm 33 is fixed to the top of the spray head housing 32 by way of a snap-in connection (locking protrusion 36 and locking groove 37 on the spray head housing 32).

In the embodiments shown in FIGS. 1 to 4, the diaphragm 33 is of flat/frusto-conical design, the smaller base being closer to the can 10 than the larger base along the periphery of which (locking protrusion 36) the diaphragm 33 can be fixed to the spray head housing 32, the throttle body 30 being formed integrally in the region of the smaller base such that it extends towards the can 10; in the embodiment shown in FIGS. 1 and 2 it extends through the mentioned fluid port 34 within the fluid communication 28 such that the frusto-conical throttle portion 35 is on the side of the fluid port 34 facing the can. The throttle portion 35 is elastic in radial direction so that it may be urged through the fluid port 34 for the purpose of assembly of the spray head.

The wall thickness of the diaphragm 33 decreases from the outside radially inwardly to the location where the throttle body 30 is connected. Like the spray head 32, the diaphragm 33 is preferably made from synthetic plastic.

Figure 3:
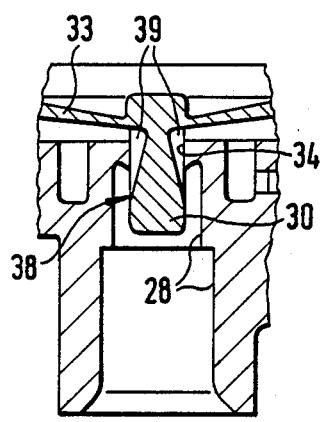
FIG. 3 is a portion of the modified embodiment of a spray head according to the illustration of FIG. 2.

The embodiment of FIG. 3 differs from that shown in FIGS. 1 and 2 only in respect of the configuration of the throttle body 30, that is to say in respect of the axial cross-sectional variation. The throttle body 30 of FIG. 3 has a circular-cylindrical peripheral surface 38 in which two diametrically disposed axial grooves 39 are formed in such a way that the depth of the grooves progressively decreases from the location where the diaphragm is fitted towards the can (not illustrated). Again, the throttle body 30 extends through the fluid port 34 within the mentioned fluid communication 28, the axial grooves being disposed in the vicinity of the fluid port 34. In this way the throttle body 30 of FIG. 3 in conjunction with the diaphragm 33 yields the same effect as the embodiment illustrated in FIGS. 1 and 2.

Figure 4:
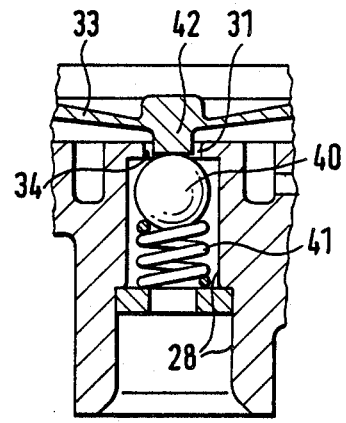
FIG. 4 is a further embodiment of part of a spray head according to the illustration of FIG. 3.

The embodiment illustrated in FIG. 4 is distinguished by the feature that the resiliently compliant diaphragm 33 cooperates with a discrete throttle body configured as a ball 40 which is resiliently biased against the elasticity of the diaphragm 33 by means of a helical compression spring 41 such that with maximum overpressure in the can a minimum flow cross-section 31 is kept open as in the already described embodiments. The diaphragm 33 continually engages the ball 40 by way of a central, axially extending peg-like projection 42.

It should be noted here that naturally the resilient bias of the diaphragm 33 is only effective when the can over-pressure is effective in the fluid communication 28. During non-use and with the dispensing valve 15 closed, ambient pressure prevails in the fluid communication 28. In that case the diaphragm is in a state of equilibrium in which the opening of the fluid cross-section 31 is maximum. Therefore, the resilient bias of the throttle body 30 by the diaphragm 33 is only effective during use of the aerosol can.

Of course, the diaphragm 33 is covered against external influences. The corresponding cover is indicated at 43 in FIGS. 1 and 2.

As illustrated in FIG. 5, the diaphragm 33 has a wavy radial cross-section between the outer peripheral edge and the connection to the central throttle body 30. This embodiment is naturally also applicable to the configurations shown in FIG. 3 or FIG. 4, as will be apparent from FIG. 6 and FIG. 7. In the embodiment shown in FIG. 5, the diaphragm 33 comprises from the outside thereof radially inwardly an axially symmetrical wave extending towards the can or downwardly, respectively, which is followed by an upwardly extending axially symmetrical wave extending right to the throttle body 30. The wave corresponds to a sinewave through 360°. It is also possible to provide more than one wave trough or wave crest, respectively.

FIG. 8 illustrates a spray head of an especially simple structure in respect of design effort, said spray head being characterized by the feature that both the spray nozzle 27 and the throttle body 30 are disposed in the centre of the normally axially symmetrical diaphragm 33. Similar to the previously described embodiments, the throttle body 30 is an integral part of the diaphragm 33, the transition between throttle body 30 and diaphragm 33 being configured as an outwardly open cup 50 for accommodating a spray nozzle cap 51 having a central nozzle opening 52. This spray nozzle/throttle body assembly is attached to the side of the spray head 26. To this end the spray head housing is formed with a lateral, preferably circular-cylindrical recess 53 which has the diaphragm 33 including the spray nozzle/throttle body assembly lockingly fitted therein, whereby a base plate 54 is clampingly secured which has a central fluid port 34 through which the throttle body 30 extends as in the previously described embodiments. The bottom of the cup-like receptacle 50 for the spray nozzle cap 51 is formed with axially extending fluid passageways 55 for ensuring fluid communication with the spray nozzle opening 52.

With the embodiment illustrated in FIG. 8, the valve body 30 including the throttle portion 35 is designed according to FIG. 5. The fluid passage 28 within the spray head housing 32, which leads to the restriction, comprises a 90° elbow section 56. For the rest, the design of the spray head 26 corresponds to that of the previously described embodiments.

The embodiment shown in FIGS. 9 and 10 differs from the previously described configurations by an additional closing valve 44 which is effective in the vicinity of the connecting piece 24 of the dispensing valve body 17 inside the can, such that said valve interrupts the fluid communication with the spray head 26 when the aerosol can (not illustrated) is approximately horizontal and especially in headfirst position. Actually, the closing valve 44 is constituted by a valve ball 45 which is axially reciprocable within the connecting piece 24 of the dispensing valve body 17 between an upper (in FIGS. 9 and 10) closing position (valve ball seat 46) and a lower fluid release position (as illustrated in FIGS. 9 and 10), the valve ball 45 being guided axially by at least three guide ribs 47 approximately uniformly distributed about the circumference. The lower fluid release position is defined by radially inwardly extending retaining protrusions 48 which are provided on or formed integrally with the lower or inward (in FIGS. 9 and 10) ends of the axial guide ribs 47. As long as the ball 45 is not in the closing position, fluid may penetrate between adjacent guide ribs 47 and past the ball 45 when the dispensing valve is open.

Without the additional closing valve 44 it may sometimes happen that upon accidental use of the aerosol can 10 in headfirst position the compressed propellant, viz. compressed air or compressed nitrogen, escapes through the riser tube 25, the dispensing valve 15 and the spray head 26, and that consequently the propellant pressure drops correspondingly so that the aerosol can becomes inoperative. This risk already exists with the aerosol can being held approximately horizontally. But such an improper use of the aerosol can must be taken into consideration, which is why the above-mentioned measures are being proposed When the aerosol can is used in an approximately upright position, the emitted stream of fluid is unable to raise the closing ball 45 right to the valve ball seat 46, so that the product discharge remains ensured at all times. In case of actuation in horizontal or headfirst position the ball 45 drops to its closing position so that no propellant may escape to the outside even with the dispensing valve 15 open.

A bypass, which is especially configured as a narrow slit 49, is formed in the vicinity of the valve ball seat 46. The fluid communication provided thereby prevents the ball 45 from dropping back and opening when the valve is in the vertical position and there is a negative pressure in the valve body.

For the rest, the dispensing valve 15 and the spray head 26 are designed in accordance with the embodiment shown in FIGS. 1 and 5, respectively.

All of the features disclosed in the application papers are claimed as being essential for the invention to the extent to which they are novel over the prior art either individually or in combination.

I claim:

1. A spray head for a can (10) containing a liquid medium (11) exposed to the pressure of a propellant (12), and said spray head being disposed at the free end of a dispensing tube (21) of a dispensing valve connected to the can, said dispensing tube having a discharge duct, aid spray head comprising a spray nozzle (27) having a passageway in fluid-communication with the discharge duct (23) of the dispensing tube (21), a throttle member (29) in said fluid-communication passageway (28) and including a resiliently biased throttle body (30) connected to said spray nozzle and formed as a single piece element including a resilient element which is exposed to ambient pressure on one side and to the overpressure prevailing in the can interior on the other side thereof during the discharge of the liquid medium, and throttle body including a member integrally connected to said resilient element and positioned in said passageway for controlling the flow cross-section (31) of said passageway in dependence on the overpressure in the can to establish an approximately constant liquid quantity per unit of time of discharge through the spray nozzle (27) until the can (10) has been substantially emptied, said resilient element constructed and arranged to establish resilient bias of the throttle body (30) effective substantially only upon use when the dispensing valve (15) is opened to establish a varying discharge opening, such that with the overpressure in the can at a maximum, a minimum flow cross-section (31) is established and with a minimum residual overpressure in the can (10) the flow-cross-section (31) is maximum.

2. A spray head for a can (10) containing a liquid medium (11) exposed to the pressure of a propellant (12), and said spray head being disposed at the free end of a dispensing tube (21) of a dispensing valve connected to the can, said dispensing tube having a discharge duct, said spray head comprising a spray nozzle (27) having a passageway in fluid-communication with the discharge duct (23) of the dispensing tube (21), a throttle member (29) in said fluid-communication passageway (28) and including a resiliently biased throttle body (30) which is exposed to ambient pressure on one side while the overpressure prevailing in the can interior acts on the other side thereof, said throttle body including means controlling the flow cross-section (31) of said passageway in dependence on the overpressure in the can to establish an approximately constant liquid quantity per unit of time of discharge through the spray nozzle (27) until the can (10) has been substantially emptied, said throttle member including a resilient element constructed and arrange to establish resilient bias of the throttle body (30) effective substantially only upon use when the dispensing valve (15) is opened to establish a varying discharge opening, such that with the overpressure in the can at a maximum, a minimum flow cross-section (31) is established and with a minimum residual overpressure in the can (10) the flow-cross-section (31) is maximum, wherein said throttle member is fixed to a spray head housing and said resilient element includes a diaphragm (33) connected to said throttle body and disposed in the spray head housing (32), said diaphragm ensuring resilient biasing of the throttle body (30) during use.

3. The spray head as claimed in claim 2 characterized in that the throttle body (30) cooperates with a substantially circular-cylindrical port (34) within the fluid communication passageway (28) between and dispensing tube (21) and spray nozzle (27) such that said port (34) is open to a greater or lesser extent due to an axial movement of the throttle body (30).

4. The spray head as claimed in claim 3, characterized in that the throttle body (30) extends through the port (34) provided in the fluid communication passageway (28), and that said port cooperates with a throttle body portion (35) whose cross-section increases or decreases in axial direction, respectively.

5. The spray head especially as claimed in claim 2 wherein said diaphragm (33) is a resiliently pliable diaphragm (33) and said throttle body is a movable ball (40), a helical compression spring urging the ball (41) against the resilient action of the diaphragm (33) such that at maximum overpressure in the can a minimum flow cross-section (31) is kept open whereas at minimum residual pressure the flow cross-section (31) is maximum.

6. The spray head as claimed in claim 2 wherein a snap-in connection secures the diaphragm (33) to the top surface of the spray head housing (32).

7. The spray head as claimed in claim 2 wherein said diaphragm (33) has frusto-conical shape having a smaller base closer to the can (10) and a larger base along the periphery (36) secured to the spray head housing (32), and said throttle body (30) integrally secured to the vicinity of the smaller base to extend towards the can (10).

8. The spray head as claimed in claim 7, characterized in that said diaphragm is a wall having a wall thickness decreasing from the outside radially inwardly to a connection to the throttle body (30).

9. The spray head as claimed in claim 2 wherein the diaphragm (33) has a wave-shaped radial cross-section between its outer periphery and the point of connection to the throttle body (30).

10. The spray head as claimed in claim 2 wherein said spray nozzle (27) and the throttle body (30) are arranged in the center of the diaphragm (33).

11. The spray head as claimed in claim 2, including a connecting member secured to said throttle body and extending upstream of the throttle body (30), said tube being connected to said connecting member, a closing valve (44) located in said connecting member and operable with said can (10) in an approximately horizontal, and a headfirst position to close the fluid communication from said tube to said spray head (26).

12. The spray head as claimed in claim 11, wherein said closing valve (44) includes a valve seat in said connecting member, a valve ball (45) reciprocated axially within said connecting member (24) of the dispensing valve (17) between a closing position, engaging said valve seat and a fluid release position spaced from said valve seat, and wherein the valve ball (45) is guided by at least three guide ribs (47) disposed approximately uniformly about the circumference.

13. The spray head as claimed in claim 12, including a bypass passageway in the vicinity of the valve seat (46).

* * * * *

UNITED STATES PATENT AND TRADEMARK OFFICE
CERTIFICATE OF CORRECTION

PATENT NO. : 4,940,170

DATED : July 10, 1990

INVENTOR(S) : HILDEGARD POPP-GINSBACH

It is certified that error appears in the above-identified patent and that said Letters Patent is hereby corrected as shown below:

Claim 7, column 8, line 28, delete "to" and substitute therefor -- in --.

Signed and Sealed this

Nineteenth Day of May, 1992

*Attest:*

DOUGLAS B. COMER

*Attesting Officer*  *Acting Commissioner of Patents and Trademarks*